(12) United States Patent
Colombi et al.

(10) Patent No.: US 7,372,177 B2
(45) Date of Patent: May 13, 2008

(54) CONTROL SYSTEM, METHOD AND PRODUCT FOR UNINTERRUPTIBLE POWER SUPPLY

(75) Inventors: Silvio Colombi, Losone (CH); Andrea Delmuè, Bellinzona (CH); Lauro Strozzi, Biasca (CH)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 11/227,280

(22) Filed: Sep. 15, 2005

(65) Prior Publication Data

US 2006/0164782 A1      Jul. 27, 2006

Related U.S. Application Data

(60) Provisional application No. 60/647,655, filed on Jan. 27, 2005.

(51) Int. Cl.
*H02J 7/00* (2006.01)
*H02J 9/00* (2006.01)
*H02J 3/00* (2006.01)

(52) U.S. Cl. ................ 307/64; 307/66; 307/17
(58) Field of Classification Search .............. 307/64, 307/66, 17; 363/130
See application file for complete search history.

(56) References Cited

U.S. PATENT DOCUMENTS 5,315,533 A * 5/1994 Stich et al. ............... 700/298

6,917,124 B2 * 7/2005 Shetler et al. ............... 307/66

OTHER PUBLICATIONS

S.W. Steele; "Uninterruptible Battery Backup for IBM AS/400 Systems", IBM J. RES. & DEV., vol. 45: Nov. 2001, pp. 763-770.
S. Shimizu et al.; "Control Technologies Utilized in the UPS", Sanyo Denki Technical Report; No. 14: Nov. 2002, pp. 5-8.
"Uninterruptible Power Supply"; product description, [online] http://en.wikipedia.org/wiki/Uninterruptible_power_supply [retrieved Dec. 30, 2004].
"Suppression of Powerline Noise with Isolation Transformers" product description, [online] http://www.blackmagic.com/ses/bruceg/EMC/isolatrans.html [retrieved Dec. 30, 2004].

(Continued)

*Primary Examiner*—Michael Sherry
*Assistant Examiner*—Michael Rutland-Wallis
(74) *Attorney, Agent, or Firm*—Cantor Colburn LLP

(57) ABSTRACT

A control system for an uninterruptible power supply (UPS) for servicing a load is disclosed. The UPS includes a first feed path and a second feed path, where the first feed path is operable in parallel with the second feed path. The first feed path is engagable via a first switch to deliver a bypass current to the load. The second feed path includes a rectifier, an inverter responsive to a control signal and in electrical communication with the rectifier, and an output transformer in electrical communication with the inverter. The second feed path is engagable via a second switch to deliver an inverter current to the load. The control system is configured for facilitating magnetization of the transformer via a back-feed from the first feed path in response to the load being fed by the first feed path, the rectifier being off, and the inverter being off.

19 Claims, 7 Drawing Sheets

OTHER PUBLICATIONS

"APOTRANS" product description, [online] http://www.powertech.co.nz/d.asp?productid=14 [retrieved Dec. 30,2004].

"Selecting a UPS System for Critical Power Applications"; product description, [online] http://www.ecmweb.com/powerquality/electric_selecting_ups_system/ [retrieved Dec. 30, 2004].

"Comparing the S&C PureWave UPS System to On-Line UPS Systems"; product description, [online] http://www.sandc.com/webzine/020904_1.asp [retrieved Jan. 24, 2005].

"Uninterruptible Power Supply (UPS) with DSP56F80x"; product description, [online] http://www.freescale.com/webapp/sps/site/application.jsp?nodeId=023Z1DxpCp8GVS [retrieved Jan. 24, 2005].

* cited by examiner

Load voltages

..... Phase-1 of model 400
— Phase-2 of model 400
--- Phase-3 of model 400

-- Phase-1 of $U_0$
— Phase-2 of $U_0$
-·- Phase-3 of $U_0$

Bridge current

— Phase-1 of Ib
— Phase-2 of Ib

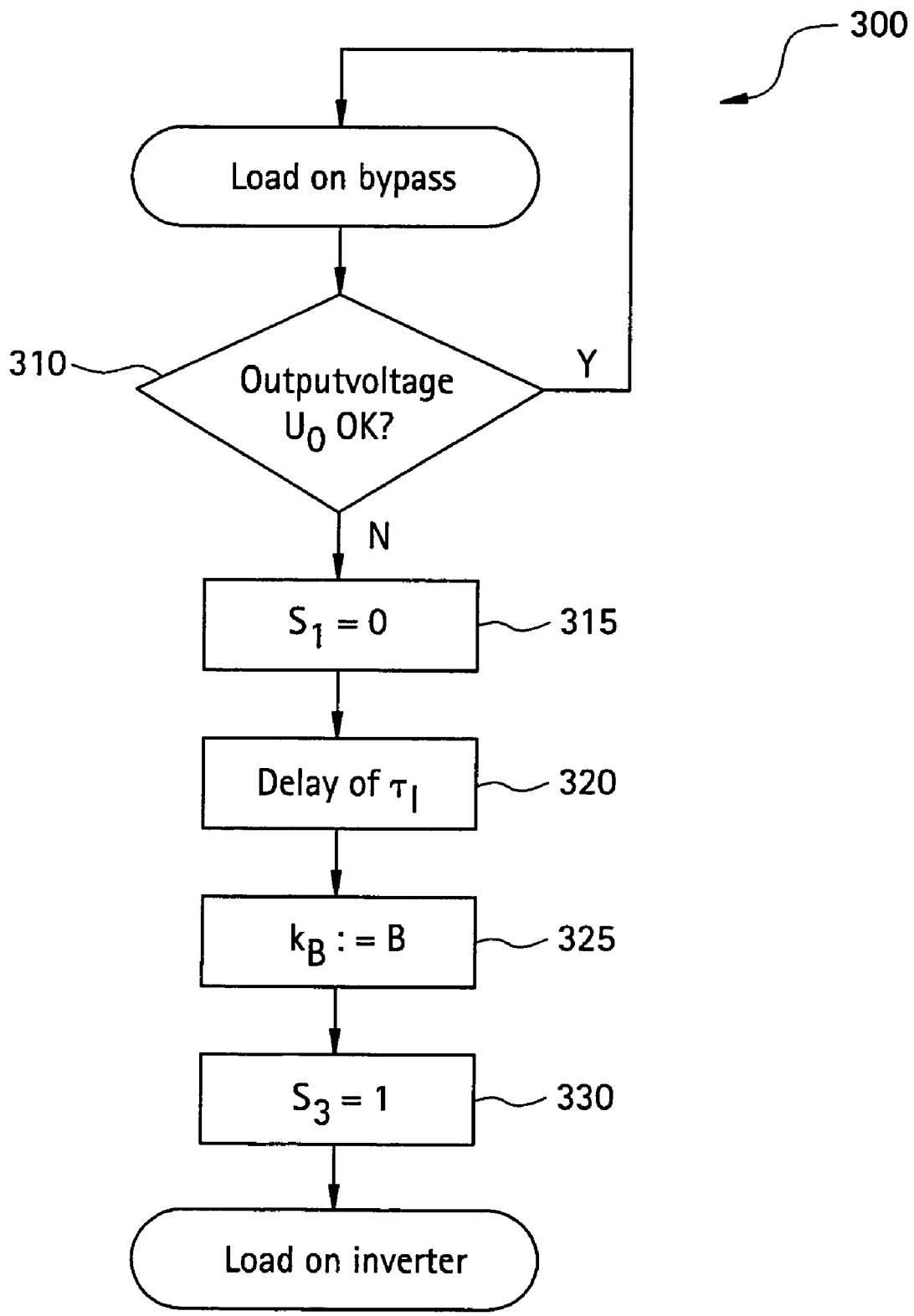

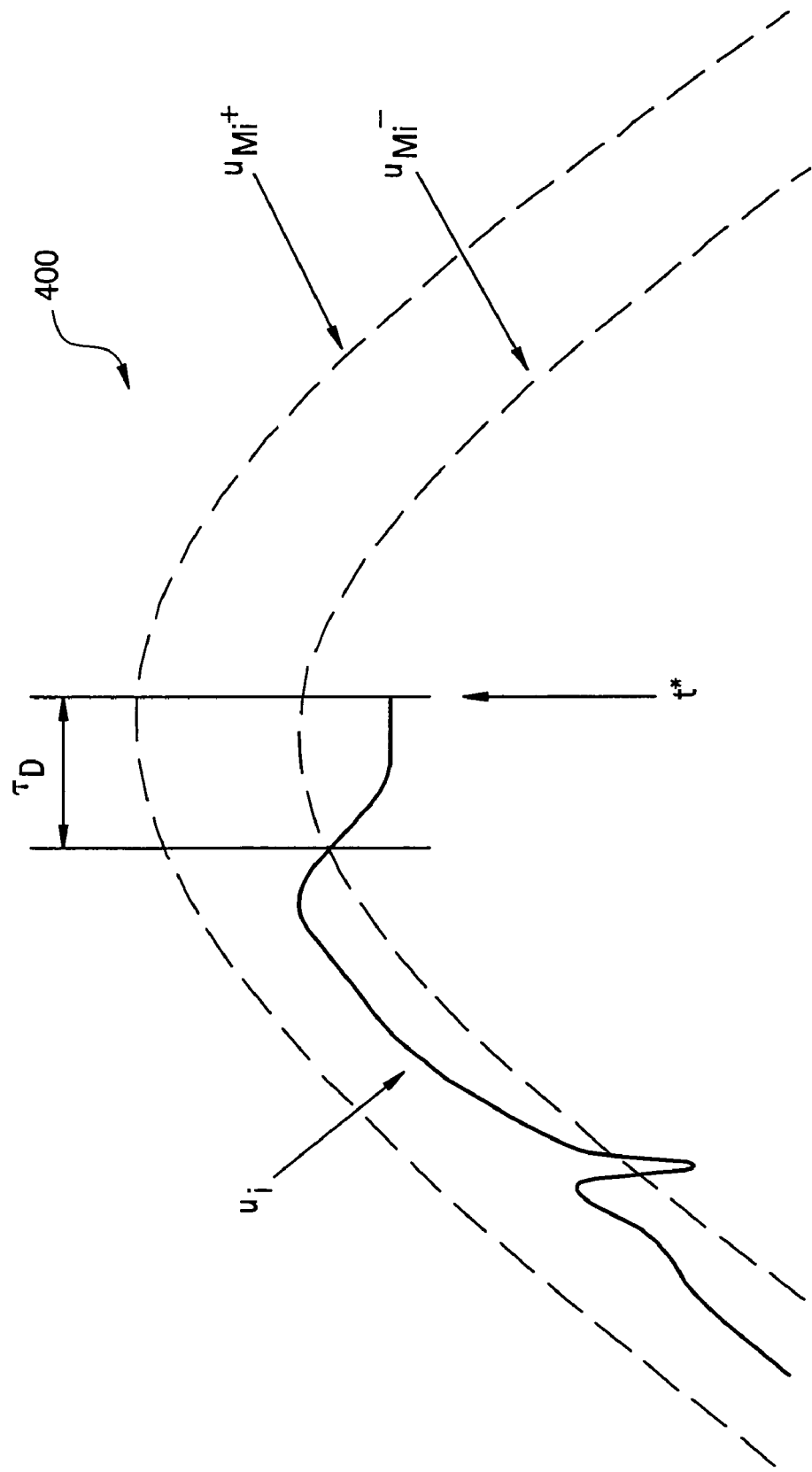

CONTROL SYSTEM, METHOD AND PRODUCT FOR UNINTERRUPTIBLE POWER SUPPLY

CROSS REFERENCE TO RELATED APPLICATIONS

This application claims the benefit of U.S. Provisional Application Ser. No. 60/647,655 filed Jan. 27, 2005, which is incorporated herein by reference in its entirety.

BACKGROUND OF THE INVENTION

The present disclosure relates generally to uninterruptible power supplies (UPSs), and particularly to control systems for economic control thereof.

UPSs are employed in a variety of applications where a constant source of power is desired at a load. A typical UPS system involves an inverter feed path, also generally referred to as the inverter, that is operably connectable in parallel with a bypass feed path, also generally referred to as the mains. The mains may be connected to a utility, but may also receive power from some other supply not connected to a utility electrical grid. The inverter may receive power from the same source as the mains, but may also receive power from some other supply.

There are several types of UPSs depending on their operation mode. Double conversion UPSs offer the maximal protection level as the load is always fed by the inverter. This type of UPS, however, may have limited efficiency, which results in higher operation cost, particularly for large units. On the other hand, with line-interactive UPSs, the load is fed by the mains and the inverter is used to correct the shape of the load voltage. This type of UPS has a better efficiency, but may not be able to maintain the quality of the output voltage when the mains frequency is variable. To some extent, it is possible to combine the advantages of the two types of UPSs with the concept of ECOMODE. The basic idea is to feed the load by the mains while constantly monitoring the mains quality. As soon as a problem on the mains is detected, the load is switched on to the inverter. The concept of ECO-MODE is presently used on UPSs without an output isolation transformer, however, such an arrangement suffers from high efficiency losses.

Accordingly, there is a need in the art for a control strategy allowing for the use of an ECOMODE UPS system that overcomes the aforementioned drawbacks.

BRIEF DESCRIPTION OF THE INVENTION

An embodiment of the invention includes a control system for an uninterruptible power supply (UPS) for servicing a load. The UPS includes a first feed path and a second feed path, where the first feed path is operable in parallel with the second feed path. The first feed path is engagable via a first switch to deliver a bypass current to the load. The second feed path includes a rectifier, an inverter responsive to a control signal and in electrical communication with the rectifier, and an output transformer in electrical communication with the inverter. The second feed path is engagable via a second switch to deliver an inverter current to the load. The control system is configured for facilitating magnetization of the transformer via a back-feed from the first feed path in response to the load being fed by the first feed path, the rectifier being off, and the inverter being off.

Another embodiment of the invention includes an uninterruptible power supply (UPS) having a first feed path and a second feed path for servicing a load. The first feed path includes a first switch engagable for delivering a bypass current to the load. The second feed path includes a rectifier, an inverter responsive to a control signal and in electrical communication with the rectifier, an output transformer in electrical communication with the inverter, and a second switch engagable for delivering an inverter current to the load. The first and second feed paths are electrically engagable and disengagable with respect to each other for providing single or parallel feed to the load. A control system for the UPS is configured for facilitating magnetization of the transformer via a back-feed from the first feed path in response to the load being fed by the first feed path, the rectifier being off, and the inverter being off.

Yet another embodiment of the invention includes a method for servicing an electrical load. Control is provided for the engagement and disengagement of a first feed path capable of delivering a bypass current to the load. Control is also provided for the engagement and disengagement of a second feed path capable of delivering an inverter current to the load. The second feed path includes a rectifier, an inverter responsive to a control signal and in electrical communication with the rectifier, and an output transformer in electrical communication with the inverter. The first and second feed paths are electrically engagable and disengagable with respect to each other for providing single or parallel feed to the load. Control is further provided for the engagement and disengagement of the first and second feed paths such that the transformer is capable of being magnetized via a back-feed from the first feed path in response to the load being fed by the first feed path, the rectifier being off, and the inverter being off.

BRIEF DESCRIPTION OF THE DRAWINGS

Referring to the exemplary drawings wherein like elements are numbered alike in the accompanying Figures:

FIG. 5 depicts in flow chart form an exemplary portion of a control scheme in accordance with an embodiment of the invention;

FIG. 6 depicts an exemplary principle of output voltage monitoring for use in accordance with an embodiment of the invention.

DETAILED DESCRIPTION OF THE INVENTION

An embodiment of the invention provides a control system for an uninterruptible power supply (UPS) that services a load. The UPS system has a bypass feed path operable in parallel with an inverter feed path, where the bypass feed path is engagable via a first switch to deliver a bypass current to the load, and the inverter feed path is engagable via a second switch to deliver an inverter current to the load.

The inverter feed path has a rectifier, an inverter responsive to a control signal for controlling the output voltage of the inverter, and an output isolation transformer. The control system is configured to magnetize the isolation transformer via a back-feed from the bypass feed path in response to the load being fed by the bypass feed path, the rectifier being off, and the inverter being off, thereby providing a high efficiency ECOMODE UPS system. With a very small decrease in efficiency, the rectifier may be kept on to maintain the battery charged, thus avoiding damage to the battery with a very slow discharge. Accordingly, an exemplary embodiment of the invention provides an advanced (high efficiency) ECOMODE for uninterruptible power supply (UPS) with an isolation transformer.

Figure 1:
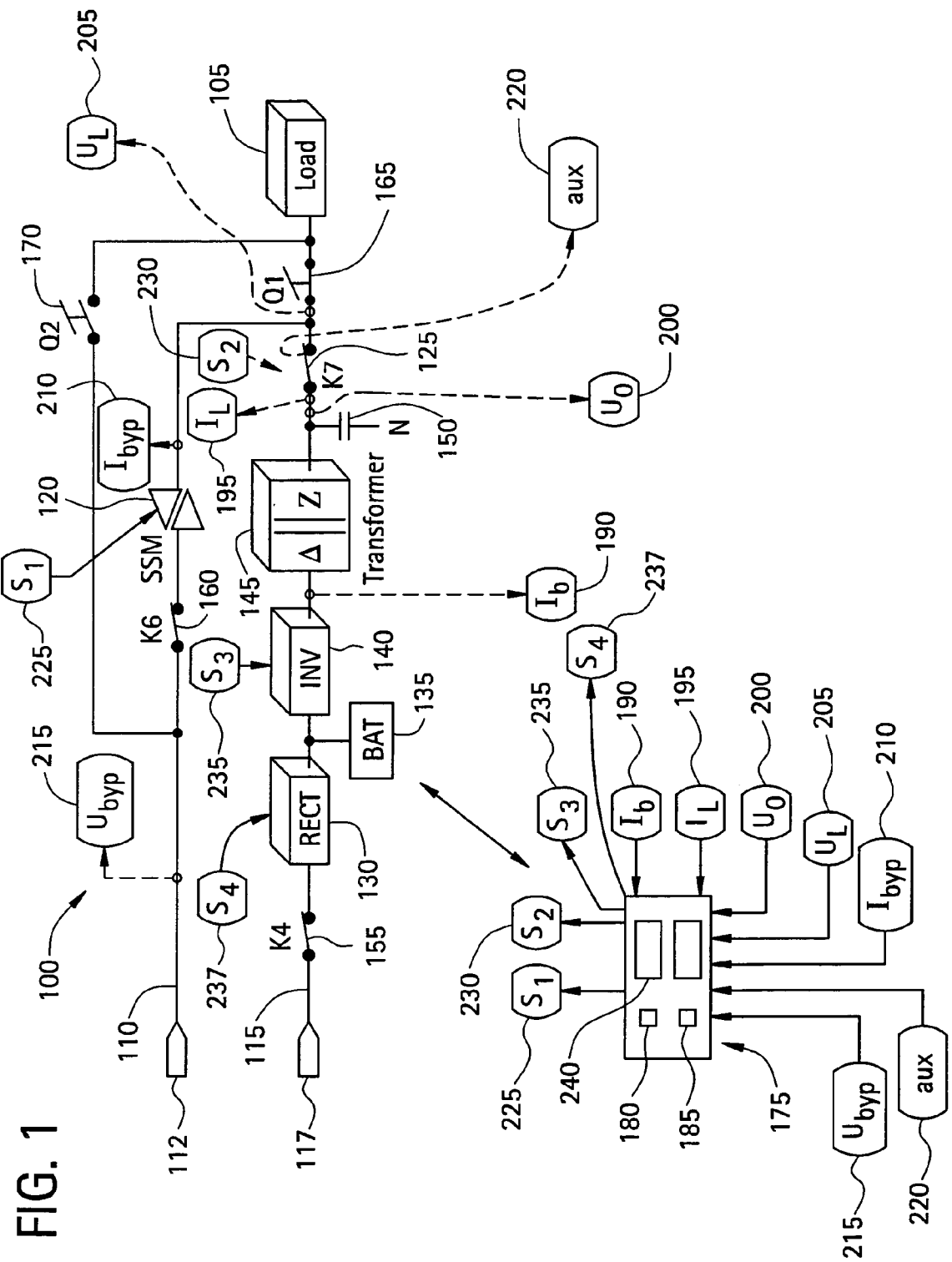
FIG. 1 depicts in one-line diagram form an exemplary UPS system in accordance with an embodiment of the invention.

FIG. 1 is an exemplary embodiment of an uninterruptible power supply (UPS) system 100 for servicing a load 105. The UPS 100 includes a bypass feed path 110 and an inverter feed path 115 that are operable in parallel with each other during the transfer of power from one path to the other. The power source 112 for the bypass feed path 110 may be a utility or other main power source. The power source 117 for the inverter feed path 115 may be the same as that of the bypass feed path 110, or it may be a different power source. The bypass feed path 110 is engagable with the load 105 via a first switch 120 to deliver a bypass current to the load 105, and the inverter feed path 115 is engagable with the load 105 via a second switch 125 to deliver an inverter current to the load 105. In an embodiment, the first switch 120 is a remote controllable static switch module (SSM) of a type known to one skilled in the art, and the second switch 125 is a remote controllable contactor of a type known to one skilled in the art. The inverter feed path 115 includes a rectifier 130, a battery 135, an inverter 140, an output isolation transformer 145, and filtering capacitors 150. Disconnect switches (K4) 155, (K6) 160, (Q1) 165 and (Q2) 170 may be employed for additional protection and/or control and/or maintenance. In an embodiment, switches (K4) 155 and (K6) 160 are circuit breakers, and switches (Q1) 165 and (Q2) 170 are manual disconnects. The leakage inductance of isolation transformer 145 and the output capacitors 150 are used together to filter the inverter output voltage (Uo) 200.

While FIG. 1 depicts a UPS 100 in one-line diagram form, it will be appreciated that UPS 100 may have multiple phases, such as three phases for example, and that any reference herein to a current or a voltage in one phase is intended to be a reference to the current and voltage of each phase.

In an embodiment, a control system 175 includes a processing circuit 180 and a storage medium 185, readable by the processing circuit 180, storing instructions for execution by the processing circuit for controlling the UPS 100 in a manner to be described in more detail below.

In an embodiment, input signals to control system 175 include inverter bridge currents (Ib) 190, inverter load currents (IL) 195, inverter output voltages (Uo) 200, load voltages (UL) 205, bypass load currents (Ibyp) 210, and bypass input voltages (Ubyp) 215, that are generated by any sensor suitable for the intended purpose. Another input signal to control system 175 may be (aux) 220 that is provided by an auxiliary contact (not specifically shown but represented also by reference numeral 220) at second switch (K7) 125 and identifies the on/off state of the main contacts of second switch 125.

While reference is made to bypass feed path 110 and inverter feed path 115, it will be appreciated by those skilled in the art that the inverter load currents IL 195 are not the same as those currents flowing through contactor K4 155.

In an embodiment, output signals from control system 175 include a command signal (S1) 225 to first switch 120, a command signal (S2) 230 to second switch 125, a command signal (S3) 235 to inverter 140, and a command signal (S4) 237 to rectifier 130.

In one embodiment, output signals 225, 230, 235 and 237 may originate from control system 175. However, in another embodiment, the same output signals or any combination thereof may be analog, may originate from another source (not shown), and may be monitored and used by control system 175.

In an embodiment, the following logic is employed:
S1=(1, 0): SSM command signal (ON, OFF), respectively;
S2=(1, 0): K7 command signal (ON, OFF), respectively;
S3=(1, 0): Inverter command signal (ON, OFF), respectively; and
S4=(1, 0): Rectifier command signal (ON, OFF), respectively.

While FIG. 1 depicts certain switches (Q1, Q2, K4, K6, K7, SSM) open and others closed, it will be appreciated that control system 175 may send appropriate control signals to change the state of these switches. As such, it will be appreciated that the state of the switches may differ from the state actually depicted in FIG. 1, but will be discussed in context with reference to FIG. 1.

During normal (inverter feed path 115) operation, the rectifier 130 converts the input power supply 117 to regulated DC to charge the battery 135 as well as supply power to the inverter 140. The inverter 140 converts the DC to a voltage & frequency regulated AC output at all times. During "stored energy" mode, that is, during an absence of power from power supplies 112 and 117 (also referred to as mains failure), the inverter 140 draws power from the battery 135 and continues to supply output power. Bypass operation that switches in the bypass feed path 110 is possible through the first switch 120, which may be a Static Switch Module (SSM) for example.

In an exemplary embodiment, the startup of rectifier 130 is accomplished automatically via switch (K4—circuit breaker) 155 or manually via switch (Q4—manual disconnect), manual bypass is accomplished via switch (Q2) 170, output power is supplied via switch (Q1) 165, short-circuit protection of SSM 120 is provided by switch (K6), and output power from inverter 140 is provided via switch (K7) 125. The transitions from the bypass feed path 110 to the inverter feed path 115 and vice-versa are controlled through the SSM 120 and breaker switch (K7) 125.

In an embodiment of an improved ECOMODE UPS system 100, as herein disclosed, the load 105 is fed by the bypass feed path 110 (also referred to as the mains) while the control system 175 constantly monitors the quality of power in that path. As soon as a problem in the bypass feed path 110 is detected, control system 175 switches the load 105 to the inverter feed path 115. In a realization of an ECOMODE operation, the SSM 120 does not switch off instantaneously as the thyristors of the SSM 120 turn off only when their currents cross zero. This matter of a time delay is addressed in an embodiment of this invention, and will be discussed in more detail below.

In the embodiment depicted in FIG. 1 having an output isolation transformer 145, the transformer 145 needs to be magnetized in order to switch on the inverter 140 at full power, and depending on the windings coupling, the inverter phases need to be properly switched on depending on the SSM phases that turn off To accomplish this, a mechanical breaker (K7) 125 having a long closing time to allow a fast "entry" of the inverter 140 in case of a mains fault (that is, loss of feed from power supply 117), may be replaced by a static switch module (SSM, but referred to herein as SSM7 since it replaces K7 and is represented in FIG. 1 by K7) 125. In this manner, it is possible to close (SSM7) 125 instantaneously.

By employing (SSM7) 125, the rectifier 130 and inverter 140 may be on and the transformer 145 kept magnetized when switch (K4) 155 is closed and (SSM7) 125 is open. When a fault is detected on the bypass feed path 110, control system 175 switches (SSM7) 125 on and switches the bypass (SSM) 120 off. In principle, with this strategy it is possible to switch on the three phases of (SSM7) 125 individually depending on the phases of (SSM) 120 that are switching off.

However, this embodiment of ECOMODE leads to an efficiency of only about 94%, with the losses being those of the bypass (SSM) 120 as well as those of rectifier 130, inverter 140 and transformer 145 operating under no-load conditions. An additional drawback of this embodiment is the output losses associated with static switch (SSM7) 125 when it is switched onto the inverter feed path 115, even under a double conversion operation.

Embodiments of an advanced ECOMODE UPS system 100 as disclosed herein may be realized by control modifications only. In digitally controlled UPSs, advanced ECOMODE may be realized by employing only software modifications. However, embodiments of the invention are not limited to digital solutions only, as analog solutions may also be applicable, and are contemplated.

In an embodiment, the control system 175 monitors inverter bridge currents (Ib) 190, inverter load currents (L) 195, inverter output voltages (Uo) 200, and load voltages (UL) 205, and provides control signals (S3) 235 to inverter 140 and (S1) 225 to SSM 120.

By way of example and with reference to FIG. 1, in response to breaker (K7) 125 being closed and (K4) 155 being open, the transformer 145 is kept magnetized via back-feed through the bypass feed path 110, the inverter 140 is off (not switched), and the rectifier 130 is off. In response to control system 175 detecting a fault on the bypass feed path 110, the SSM 120 is switched off, and after a defined time delay, the inverter 140 is switched on. In an embodiment, this time delay is computed using an optimal switching strategy depending on the load currents and the fault type. In general, however, the time delay serves to maximize the phases of SSM 120 that are effectively turned off while avoiding a de-magnetization of the transformer 145.

In embodiment, an exemplary advanced ECOMODE operation features an efficiency greater than 98%. Since just the control electronics (depicted generally as control system 175) are live, the losses are those of the bypass SSM 120 and those related to the magnetization currents of transformer 145. In an embodiment, two variants are possible. First, the rectifier 130 is switched on only when a fault is detected and when the battery has been discharged down to a specified level, which may be possible with some types of batteries, while other types of batteries cannot be discharged slowly without jeopardizing their lifetime. In the case of the second variant where the battery lifetime is jeopardized, the rectifier 130 is always be switched on. In the second variant where the rectifier 130 is switched on, there is little influence on the efficiency in ECOMODE as the rectifier 130 is just loaded by virtue of the consumption of the control electronics 175.

Another advantage of an exemplary advanced ECOMODE operation is that the input power factor (PF) and the total harmonic distortion (THDI) of the system 100 are basically those of the UPS load 105. Even where the majority of loads are inductive, the filter capacitors 150 provide an improvement of the PF.

Embodiments of the invention (advanced ECOMODE operation) may be applied to single UPSs or parallel UPSs. In the latter case, a fast communication link between UPSs is desirable because all the units need to perform the switching actions (SSMs OFF and inverters ON) in synchronism. Here, a digital control system 175 makes it possible to implement a powerful implementation.

Figure 2:
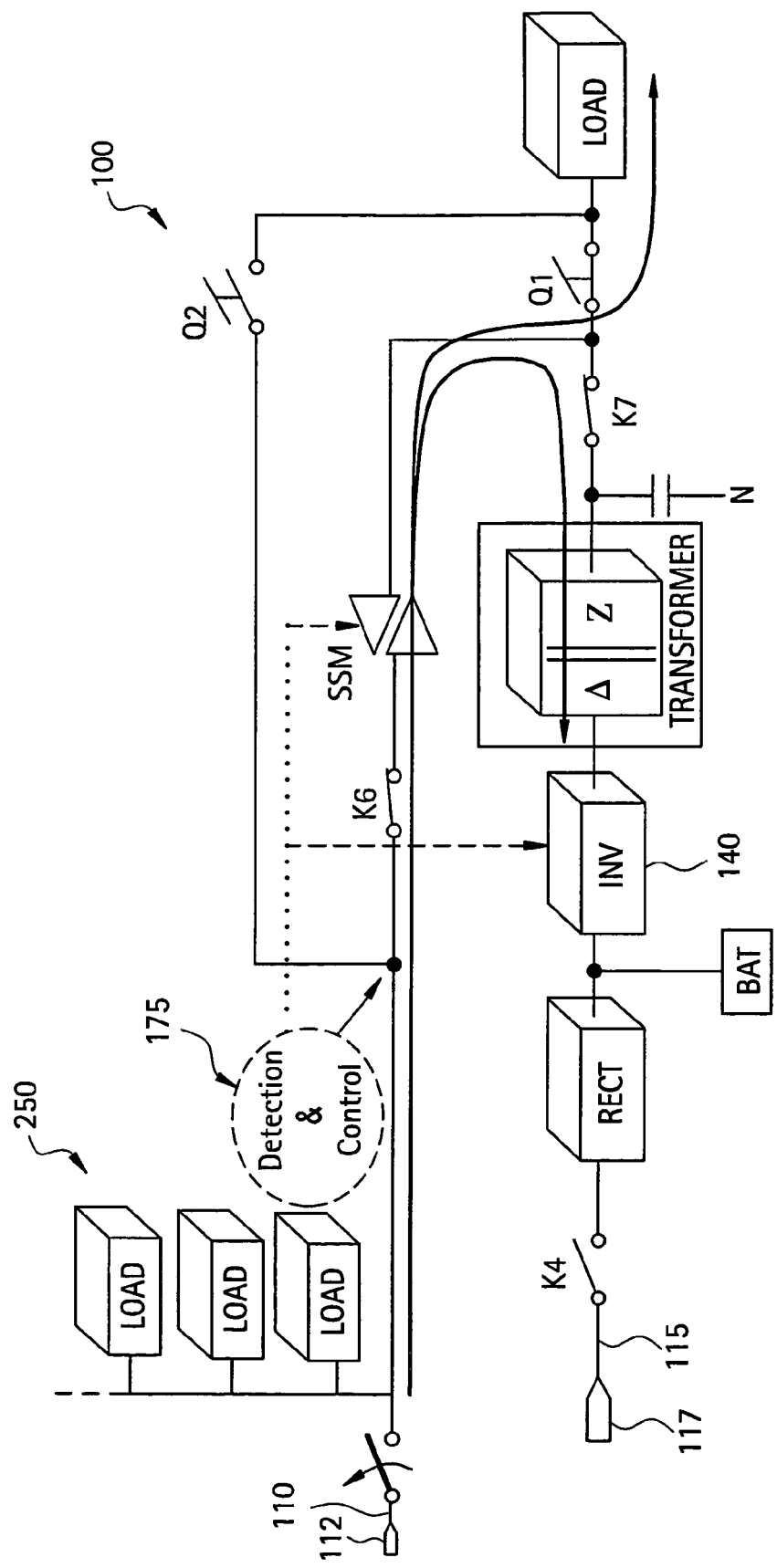
FIG. 2 depicts a similar one-line diagram form to that of FIG. 1 for use in accordance with an embodiment of the invention.

In an alternative embodiment, SSM 120 may be replaced with a controlled-SSM, herein referred to as CT-SSM 120, which may be based on IGCTs or GTOs for example, to allow an instantaneous turn off of the CT-SSM 120. As with (K7) and (SSM7) 125 discussed previously, SSM and CT-SSM will be referred to by reference numeral 120 in FIG. 1, but will be distinguished by the context in which they are discussed. In an embodiment where (K7) 125 is closed and (K4) 155 is open, the transformer 145 is kept magnetized from the back-feed through the bypass feed path 110, the inverter 140 is off (not switched), and the rectifier 130 is off. When a fault is detected on the bypass feed path 110, the CT-SSM 120 is switched off and the inverter 140 is switched on, via control system 175. Embodiments employing a CT-SSM 120 also feature an efficiency greater than 98%, but in addition no computations are required to determine an optimal switching strategy to delay the switching on of the inverter 140 from the switching off of the CT-SSM 120. However, it is contemplated that the CT-SSM 120 embodiment is more expensive than a SSM 120 embodiment and may require hardware changes. Furthermore, the IGCTs and GTOs should not be switched off in any condition. Notwithstanding the aforementioned conditions, an embodiment employing a CT-SSM 120 is considered to be within the scope of the invention disclosed herein. A real mains failure (in this case, loss of power from supply 112) is usually a complex phenomenon that may happen very far from the user location, and as a consequence may generate voltage oscillations due to the long transmission lines. FIG. 2 shows a simplified schematic of a mains failure in an exemplary UPS system 100. From the viewpoint of the UPS system 100, a mains failure may be seen as a huge load 250, as all the loads that are downstream of the fault are paralleled and offer a very low impedance to the output of UPS system 100. An inverter 140 that has to be switched on from ECOMODE in such a situation is virtually in front of a short-circuit. In another situation, such as if the bypass feed path 110 is broken near to the UPS system 100 for example, the inverter 140 has to front an open-circuit of the bypass feed path 110. The huge load and fronted open-circuit scenarios are considered two extreme cases that a real mains fault falls somewhere in-between.

To validate embodiments of the invention directed to advanced ECOMODE UPSs, experimental studies have been performed.

A first series of experiments have been conducted on a 60 kVA (kilo-volt-ampere) UPS, with test parameters involving:

opening of the bypass feed path at various loads (0, 25, 50, 100%);

2 types of load, resistive and inductive ($\cos\phi=0.8$);

balanced and unbalanced conditions (0/50l100%);

short-circuit of one phase (phase-neutral) at 0 and 100% load; and short-circuit of the three phases together at 0 and 100% load.

Under all test conditions, satisfactory results were observed.

Figure 3:
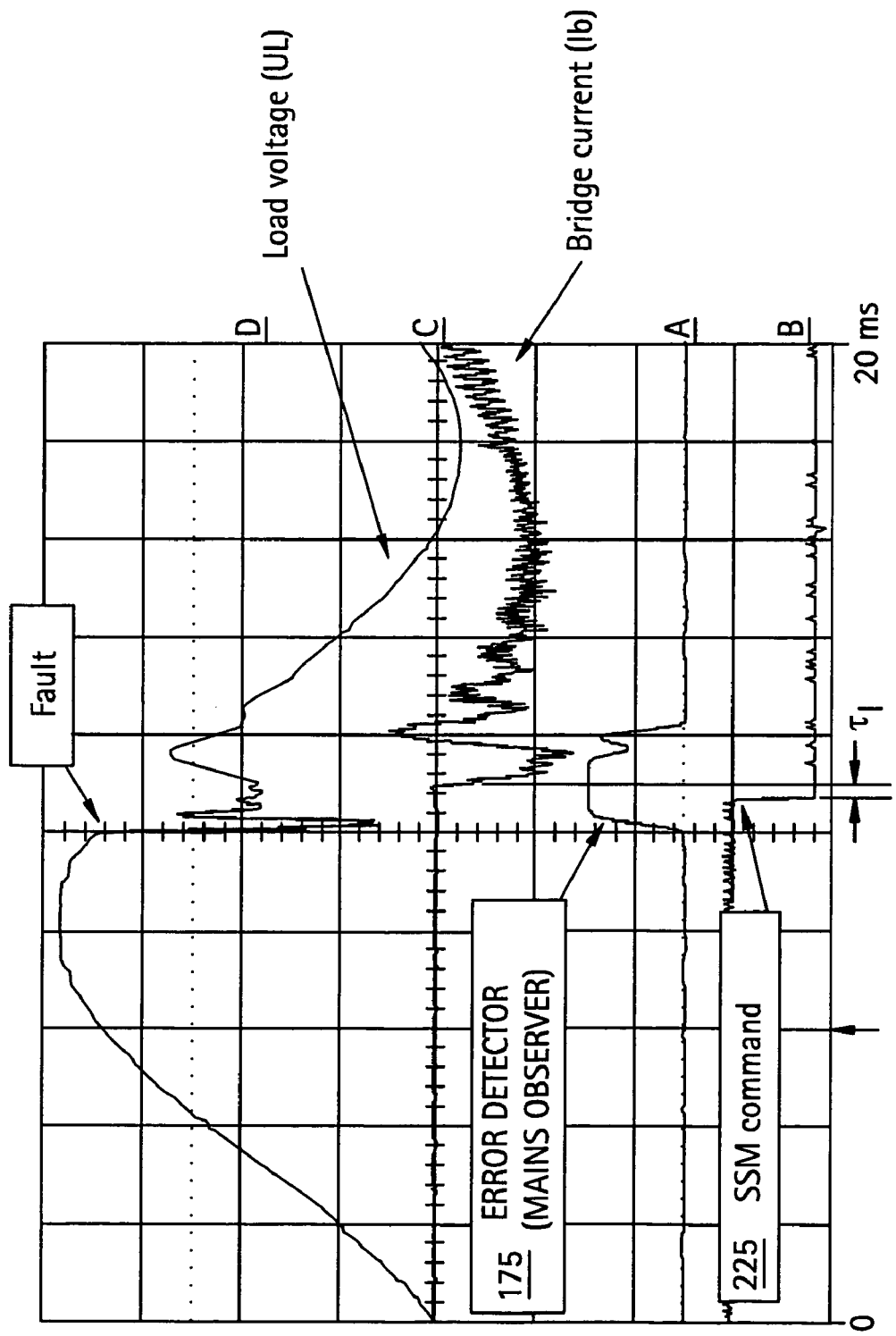
FIGS. 3-4 depict exemplary empirical data illustrating operational characteristics of exemplary embodiments of the invention.

FIG. 3 illustrates the results obtained during a bypass short-circuit test on a 60 kVA UPS. The three bypass phases were short-circuited together when the UPS was under full load conditions at cosφ=0.8. An exemplary control system 175 (digital mains observer) detected immediately the fault on the bypass feed path 110, and as a consequence an off command to the SSM 120 was issued, and after a specific computed time delay, the inverter 140 was switched on. As a result, the voltage at the load 105 was affected by the fault just during a short time duration (about 1.5 ms). A second series of experiments have been conducted on a 400 kVA UPS, with test parameters involving:

opening of the bypass feed path at various loads (0, 25, 50, 100%); and an inductive load (cos φ=0.8).

Figure 4A:
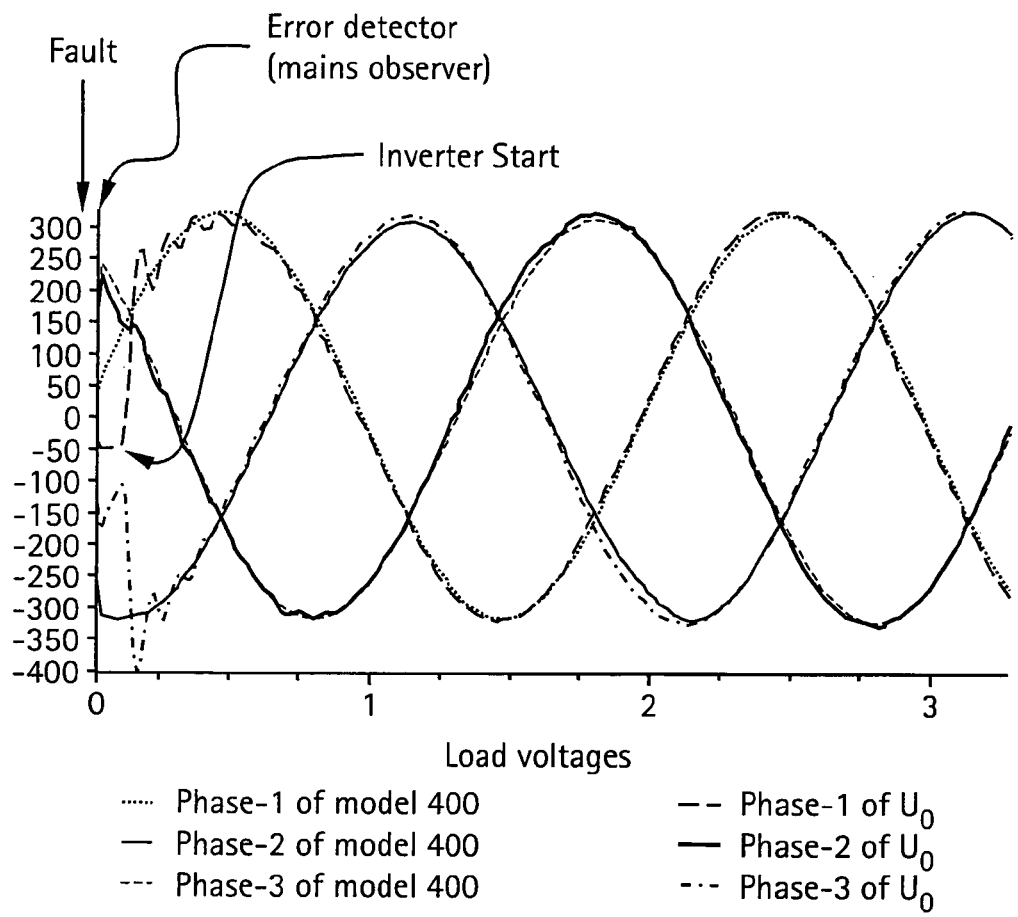
Figure 4B:
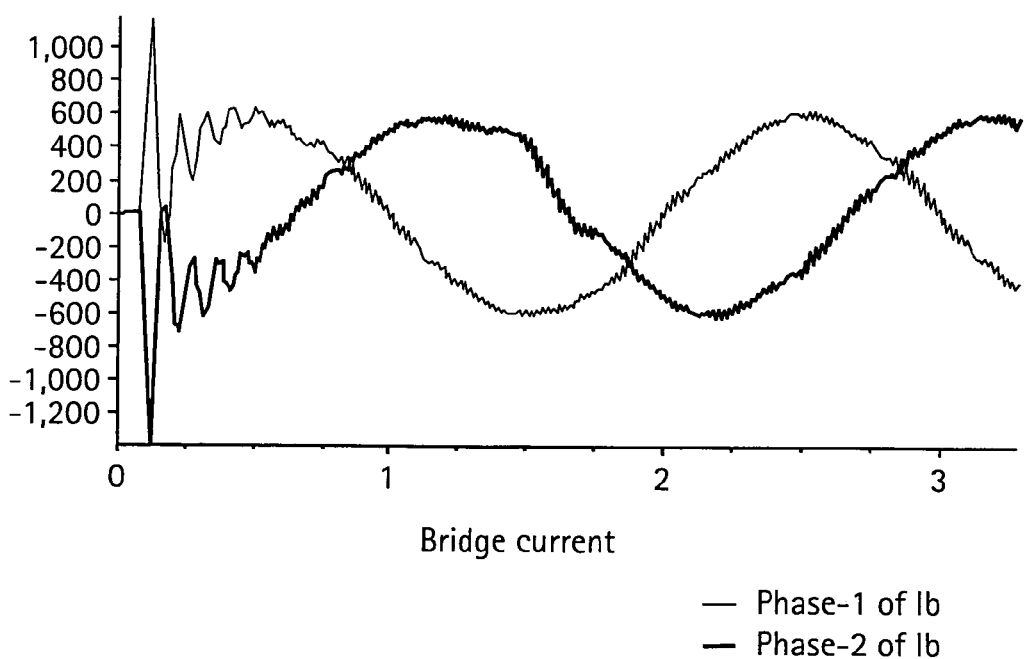
Figure 7:
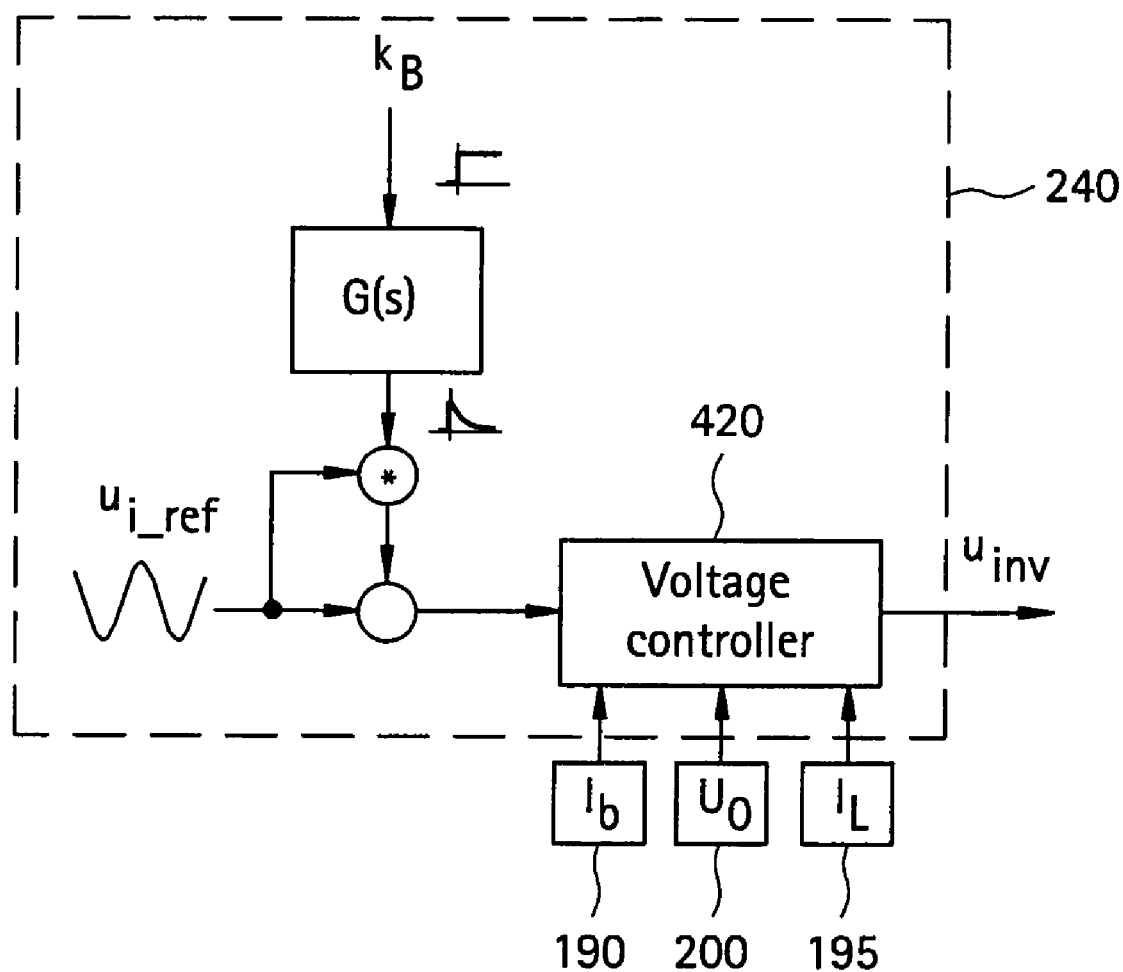
FIG. 7 depicts in block diagram form an output voltage control boost feature for use in accordance with an embodiment of the invention.

FIG. 4 illustrates the results obtained during a bypass opening test on a 400 kVA UPS. The three bypass phases were opened when the UPS was under full load conditions at cos φ=0.8.

Similarly, an exemplary control system 175 (digital mains observer) detected immediately the fault on the bypass feed path 110, and as a consequence an off command to the SSM 120 was issued, and after a specific computed time delay, the inverter 140 is switched on. As a result, the voltage at the load 105 was affected by the fault just during a short time duration (less than 2 ms). After 3 ms the load voltage was restored within an acceptable standard tolerance.

The transition from an advanced ECOMODE operation to a normal mode operation, that is, power feed to the load 105 transitioning from the bypass feed path 110 to the inverter feed path 115, will now be discussed with reference to FIGS. 1 and 5-7.

With reference first back to FIG. 1, the command signals and variables used in and by control system 175 include (S1) 225, (S2) 230 and (S3)235 for the command signals, and inverter bridge currents (Ib) 190, inverter load currents (IL) 195, inverter output voltages (Uo) 200, and load voltages (UL) 205, for the variables.

Referring now to FIG. 5, an exemplary flow chart 300 is depicted that illustrates the operation of an exemplary embodiment of the invention in ECOMODE, which may be realized in either a digital or an analog implementation. In an embodiment, the output voltages Uo 200 (U1, U2 and U3 for each of three phases) are continuously monitored via an adaptive voltage monitoring scheme embedded within the software of control system 175, which provides an accurate and robust detection of the utility disturbances. The principle of this adaptive voltage monitoring scheme is illustrated in FIG. 6 and is based on a sinusoidal model 400 synchronized to the utility voltage (on feed path 110 for example), where each load voltage Ui of UL 205 is compared to an upper $U_{Mi}^+$ and a lower $UM_{Mi}^-$ voltage limit of the model. To trigger the transition from ECOMODE to normal mode (trigger point being represented by t* in FIG. 6), the instantaneous load voltage Ui has to stay outside the limits $U_{Mi}^+$ and $U_{Mi}^-$ for a time duration greater than $\tau_D$, which allows for utility micro-interruptions to be filtered. To obtain an accurate and robust detection, small tolerance bands may be used, which is made possible by employing an adaptive model 400, where not only is the model synchronized to the utility voltage with a PLL (Phase Locked Loop), but also the amplitude of the model is continuously adapted to the utility voltage amplitude. This adaptive model may be realized by continuously adapting the rms voltage of each phase model voltage to the rms voltage of the corresponding utility phase voltage.

Referring back to the flow chart 300 of FIG. 5, if the output voltage monitoring is not OK for every phase (process step 310), the process of switching from bypass feed path 110 to the inverter feed path 115 is initiated by setting the SSM command signal S1 to 0 (process step 315). In an embodiment, SSM 120 uses thyristors and therefore the effective switching off of each individual SSM phase occurs when the phase current crosses zero. For this reason, a time delay $\tau_I$ is introduced (process step 320) before switching on the inverter 140. The basic idea of the time delay $\tau_I$ is to minimize the time during that the bypass feed path 110 and the inverter feed path 115 are paralleled, while avoiding a de-magnetization of the transformer 145, which helps to minimize the distortion of the output voltage Uo 200. Just before switching on the inverter 140 (step 330), a voltage boost factor $k_B$ is set to a specific value B (process step 325). Here, $k_B$ is used to introduce a transient boost on the inverter reference voltages Ui_ref for an output voltage controller 420, which is part of control circuitry 240 of control system 175, and is best seen by referring to FIG. 7. The transfer function G(s) represents the transient effect of the boost action. This boost, together with the bandwidth of the output voltage controller 420, allows a prompt reaction of the inverter 140 via inverter control voltage Uinv. Additional inputs to voltage controller 420 include inverter bridge currents (Ib) 190, inverter output voltages (Uo) 200, and inverter load currents (IL) 195.

With reference to FIG. 1, the activation of the ECOMODE feature may be done as follows, assuming that the inverter 140 is initially switched off and the load 105 is initially on the bypass feed path 110:

1. Soft start the inverter 140 to smoothly magnetize the transformer 145, where the switch (K7) 125 is open, and inverter command signal S3=1.

2. Command to close switch (K7) 125 with command signal S2=1. In an embodiment where switch (K7) 125 is supplied by the inverter voltages, (K7). 125 cannot be closed with the inverter 140 switched off.

3. Command to turn on SSM 120 with command signal S1=1.

4. Command to switch off the inverter 140 with command signal S3=0.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits.

The technical effect of the executable instructions is to operate an UPS system in an advanced ECOMODE condition having an efficiency upwards of about 98%.

In view of the foregoing, some embodiments of the invention may have some of the following advantages: a UPS control system and strategy that is adaptable to installed UPS systems by the implementation of control software only; a control system for UPSs that may be applied to various UPS topologies, such as, where galvanic isolation on the bypass is realized through a multi-input transformer, the concept may be easily applied with the additional advantage that the transformer remains magnetized through the bypass primary; a control system for UPSs that may be applied to three phase UPSs as well as to low power single phase UPSs; a soft bypass transfer methodology that may be applied to UPSs of any power level, and to parallel UPS systems; a control system for UPSs that may be implemented via digital control or analog control; an advanced ECOMODE operation for a UPS having an efficiency greater than 98%, a high level of protection, and no hardware or construction modifications to the UPS, just the software modifications; an advanced ECOMODE for UPSs with an output transformer that may employ different winding connections, such as Δ-Y and Δ-Z for example; and, use of a SSM that is controllable at turn off.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A control system for an uninterruptible power supply (UPS) for servicing a load, the UPS having a first feed path operable in parallel with a second feed path, the first feed path being engagable via a first switch to deliver a bypass current to the load, the second feed path having a rectifier, an inverter responsive to a control signal and in electrical communication with the rectifier, and an output transformer in electrical communication with the inverter, the second feed path being engagable via a second switch to deliver an inverter current to the load, the control system configured for facilitating:

magnetization of the transformer via a back-feed from the first feed path in response to the load being fed by the first feed path, the rectifier being off, and the inverter being off.

2. The control system of claim 1, comprising:
   a processing circuit; and
   a storage medium, readable by the processing circuit, storing instructions for execution by the processing circuit for causing the magnetization of the transformer.

3. The control system of claim 2, wherein the storage medium further stores instructions for execution by the processing circuit for:
   in response to a fault in the first feed path, disconnecting the load from the first feed path, and connecting the load to the second feed path.

4. The control system of claim 2, wherein the storage medium further stores instructions for execution by the processing circuit for:
   in response to a fault in the first feed path, disconnecting the load from the first feed path, waiting a time delay, and then turning the inverter on and connecting the load to the second feed path.

5. The control system of claim 4, wherein the storage medium further stores instructions for execution by the processing circuit for:
   providing a transient voltage boost to the inverter subsequent to waiting the time delay and prior to turning the inverter on and connecting the load to the second feed path.

6. The control system of claim 2, wherein the storage medium further stores instructions for execution by the processing circuit for:
   in response to the first and second switches being off, the inverter being off, the load being connected to the first feed path, and in response to a command signal to operate in an ECOMODE, activating control signals to turn the inverter on, then close the second switch, then close the first switch, and then turn the inverter off.

7. The control system of claim 2, wherein the storage medium further stores instructions for execution by the processing circuit for:
   in response to a load voltage being outside of a voltage model profile for a defined time duration, causing the feed to the load to shift from the first feed path to the second feed path.

8. The control system of claim 7, wherein the voltage model profile is a sinusoidal profile that includes an upper limit and a lower limit, and is synchronized to utility voltage source.

9. An uninterruptible power supply (UPS) for servicing a load, the UPS comprising:
   a first feed path having a first switch engagable for delivering a bypass current to the load;
   a second feed path having a rectifier, an inverter responsive to a control signal and in electrical communication with the rectifier, an output transformer in electrical communication with the inverter, and a second switch engagable for delivering an inverter current to the load, the first and second feed paths electrically engagable and disengagable with respect to each other for providing single or parallel feed to the load; and
   a control system configured for facilitating:
   magnetization of the transformer via a back-feed from the first feed path in response to the load being fed by the first feed path, the rectifier being off, and the inverter being off.

10. The UPS of claim 9, wherein the control system comprises:
    a processing circuit; and
    a storage medium, readable by the processing circuit, storing instructions for execution by the processing circuit for causing the magnetization of the transformer.

11. The control system of claim 10, wherein the storage medium further stores instructions for execution by the processing circuit for:
    in response to the first and second switches being off, the inverter being off, the load being connected to the first feed path, and in response to a command signal to operate in an ECOMODE, activating control signals to turn the inverter on, then close the second switch, then close the first switch, and then turn the inverter off.

12. The control system of claim 10, wherein the storage medium further stores instructions for execution by the processing circuit for:

in response to a load voltage being outside of a voltage model profile for a defined time duration, causing the feed to the load to shift from the first feed path to the second feed path.

13. A method for servicing an electrical load, comprising:

providing control for the engagement and disengagement of a first feed path capable of delivering a bypass current to the load;

providing control for the engagement and disengagement of a second feed path capable of delivering an inverter current to the load, the second feed path having a rectifier, an inverter responsive to a control signal and in electrical communication with the rectifier, and an output transformer in electrical communication with the inverter, the first and second feed paths being electrically engagable and disengagable with respect to each other for providing single or parallel feed to the load; and providing control for the engagement and disengagement of the first and second feed paths such that the transformer is capable of being magnetized via a back-feed from the first feed path in response to the load being fed by the first feed path, the rectifier being off, and the inverter being off.

14. The method of claim 13, further comprising:

in response to the first and second feed paths being disengaged from the load, the transformer being disengaged from a power source, and the inverter being off, and in response to a command signal to operate in an ECOMODE, activating control signals to turn the inverter on, then engage the load with the transformer, then engage the load with the first feed path, and then turn the inverter off.

15. A computer program product for controlling an uninterruptible power supply (UPS) for servicing a load, the computer program product comprising a computer readable medium having computer readable program code means embodied in the medium, the computer readable program code means capable of implementing the method of claim 13.

16. The control system of claim 1, further comprising:

a third switch disposed in the second feed path upstream of the rectifier to disconnect the rectifier from a supply of main power; and wherein the control system is further configured for facilitating back-feed magnetization of the transformer in response to the first switch being closed, the second switch being closed, and the third switch being open.

17. The control system of claim 16, wherein:

the second feed path comprises a battery disposed in operable communication with the rectifier for receiving a charge therefrom, and in operable communication with the inverter for providing a supply of power thereto; and the control system is further configured for facilitating back-feed magnetization of the transformer with the rectifier being either off or on, thereby enabling charging of the battery on command during delivery of a bypass current to the load.

18. The UPS of claim 9, further comprising:

a third switch disposed in the second feed path upstream of the rectifier to disconnect the rectifier from a supply of main power;

the second feed path further comprising a battery disposed in operable communication with the rectifier for receiving a charge therefrom, and in operable communication with the inverter for providing a supply of power thereto;

wherein the control system is further configured for facilitating back-feed magnetization of the transformer in response to the first switch being closed, the second switch being closed and the third switch being open, and with the rectifier being either off or on, thereby enabling charging of the battery on command during delivery of a bypass current to the load.

19. The method of claim 13, wherein the second feed path further comprises a battery disposed in operable communication with the rectifier for receiving a charge therefrom, and in operable communication with the inverter for providing a supply of power thereto, the method further comprising:

providing control for connecting or disconnecting the battery during back-feed magnetization of the transformer, thereby enabling charging of the battery on command during delivery of a bypass current to the load.

* * * * *